A. C. MURPHY.
DUMPING CAR.
APPLICATION FILED JUNE 24, 1913.

1,227,819.

Patented May 29, 1917.
2 SHEETS—SHEET 1.

Witnesses
Daniel Webster, Jr.
E. W. Smith

Inventor
Albert C. Murphy
By
Attorney

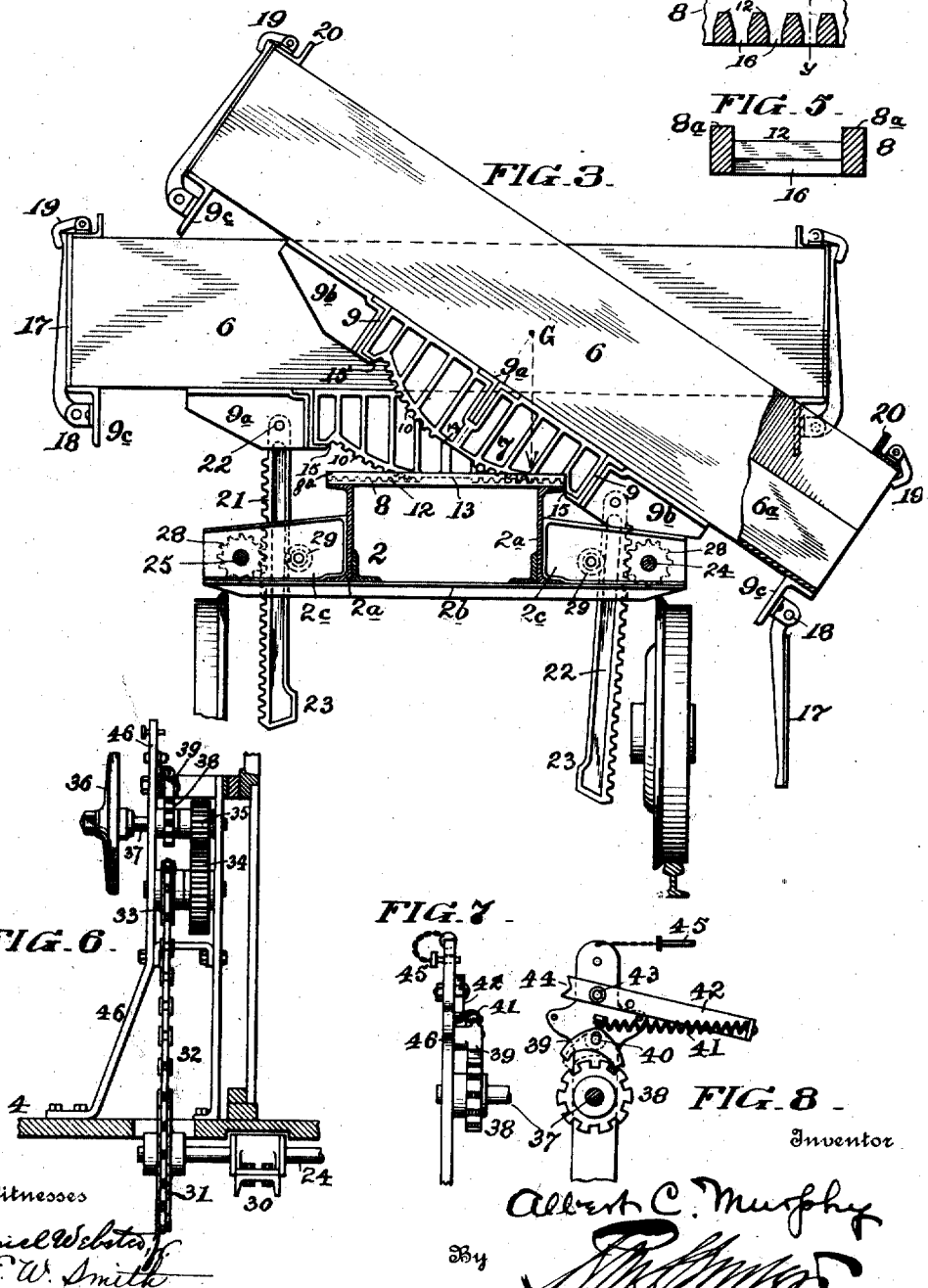

UNITED STATES PATENT OFFICE.

ALBERT C. MURPHY, OF NEW YORK, N. Y., ASSIGNOR TO UNIVERSAL CAR AND MANUFACTURING CO. INC., OF NEW YORK, N. Y., A CORPORATION OF NEW YORK.

DUMPING-CAR.

1,227,819.  Specification of Letters Patent.  Patented May 29, 1917.

Application filed June 24, 1913. Serial No. 775,462.

*To all whom it may concern:*

Be it known that I, ALBERT C. MURPHY, a citizen of the United States, and resident of New York, county of New York, and State of New York, have invented an Improvement in Dumping-Cars, of which the following is a specification.

The object of my invention is to provide a construction of dumping car for railway purposes, which may be used either for construction work or for carrying ore or other material in bulk, the car being so constructed that the contents thereof may be dumped to either side of the track in a speedy and satisfactory manner. My object is further, to provide such dumping car with a plurality of separate dumping compartments or bodies, which may be separately oscillated from the ends of the car, whereby fractional portions of the total load may be dumped at different places on the same or different sides of the track, when required.

In carrying my invention into practice, I provide a main car frame supported at each end upon trucks, the ends of the car frame having platforms (housed if desired) and containing the operative means for controlling the dumping, said frame provided with one or more box bodies supported upon the car frame in such manner as to be capable of rocking more or less similar to a cradle, and adapted to dump to either side of the car, said box bodies being actuated by the operative means for controlling the dumping, whereby the said action may be definitely and speedily performed, and controlled from the end or ends of the car. My invention further consists in so constructing the cradle or rocker supports for the dumping box bodies that their approximate centers of gravity travel laterally in respect to the longitudinal line of the car frame during the act of dumping, so as to cause the said center of gravity to remain substantially over the axis of rocking contact of the car bodies with the car frame, whereby the manipulation of the said bodies may be more easily accomplished and no undue strain put upon the dumping mechanism. My object is further, to provide means for locking the box bodies in their normal horizontal position upon the car frame, so that in transport the said bodies will not be permitted to oscillate.

My invention also comprehends many details of construction which, together with the features above specified, will be better understood by reference to the drawings, in which:—

Figure 2:
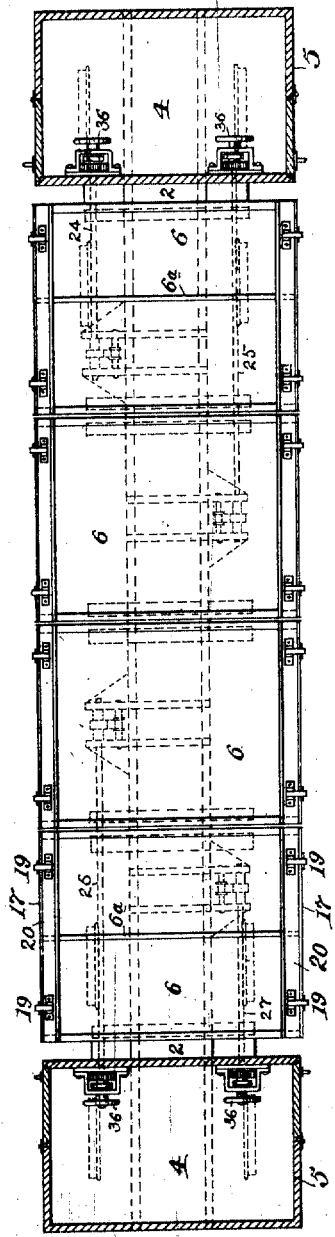
Figure 1:
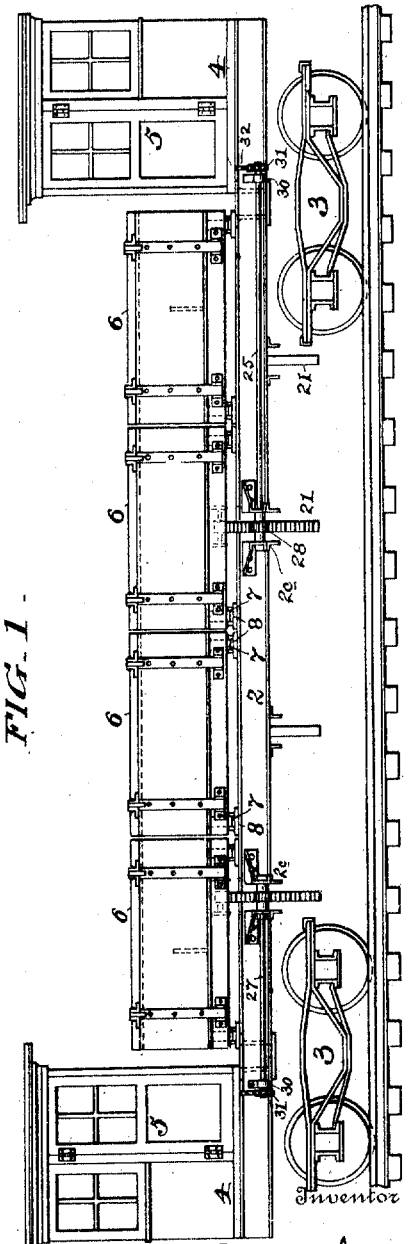

Figure 1 is a side elevation of a dumping car embodying my invention; Fig. 2 is a plan view of the same with the cabs in section; Fig. 3 is a cross section of the car showing one of the box bodies rocked to dumping position; Figs. 4 and 5 are sections showing details of the rocker bed; Fig. 6 is a side elevation with part in section, showing the means for operating the tilting means; and Figs. 7 and 8 are elevations of portions of the same.

2 is the main or car frame and may consist of a longitudinal girder construction of any suitable form capable of providing the strength required for a car of this type. As shown, it comprises the longitudinal girders $2^a$ connected across at the top and having transverse bottom angle plates $2^b$ extending laterally of the girders in the brackets $2^c$ under the bodies of the car. The car frame is pivoted near each end upon the trucks 3 which may, if desired, be electrically or otherwise driven, as is well known in railway practice. This car frame 2 is also preferably provided at its ends with platforms 4, which may be housed by suitable cabs 5 for containing the devices for performing and controlling the dumping and for protecting the workmen. If the car is electrically propelled, these cabs may also act as protection to the motorman as in the case of most trolley cars. When my improved car is used as a trailer in a train, the cabs at the ends may be dispensed with and the platforms reduced to a minimum area to provide a working support for the operator who controls the dumping.

Intermediate of the end platforms are arranged a plurality of dumping box bodies 6, said bodies each supported upon rockers 7, rocking upon transverse beds 8 built into and transversely of the car frame 2 and extending to each side of the central longitudinal line of the car. The bottoms of these box bodies have longitudinal beams 9, $9^a$ and $9^c$, between the beams 9 of which, near each end of the bodies, are the transverse rockers 7. The beams 9 are preferably of shape so as to lock the rockers in place (Fig. 3). These rockers fit around the longitudinal beam $9^a$ and extend between the beams 9 and are rigidly secured in place. They are provided with teeth 10 which engage teeth 12 upon the transverse beds 8. This construction prevents the sliding displacement of the body during the act of dumping or during rough usage of the car in act of transportation. The beds 8 have sides 8ª at each side of the teeth 12 which prevent displacement of the rockers 7 in the direction of the length of the car. Moreover, to cause the body to maintain a normal horizontal position upon the beds of the car frame, I form the bed 8 and rocker 7 at their middle portions with extended flattened portions 13 and 14 respectively, which, when in direct contact, cause the body to assume and maintain a horizontal condition, when it is brought to approximately a central normal position. The spaces between the teeth of the rocker beds 8 are preferably open as at 16, to permit any dirt to pass freely through and not obstruct the action of the rocker (Figs. 4 and 5.)

The box bodies are open at their sides, except so far as the doors 17 close them, said doors being hinged at 18 to the under side beams 9ᶜ and arranged to close against the upper side angle irons 20 of the body. When closed, the doors may be locked by the hooks or latches 19. The particular construction of the doors and their manner of hinging, locking and releasing, may be varied. In the two end box bodies, I have shown division plates 6ª, by which the bodies are divided into compartments open at each side of the car except for the doors 17. By use of these division plates, the bodies are stiffened transversely and provide capacity for carrying separate classes of materials at one time, or different portions of the same material. These division plates 6ª may be omitted, if desired.

To rock the box bodies, the following mechanism is provided: The car frame 2 is provided with a plurality of shafts 24, 25, 26 and 27, respectively leading to a position under each of the box bodies 6 (Fig. 2), and said shafts extend to the ends of the car. As shown, two of these shafts, 24 and 25, extend to one end of the car, and the other two shafts, 26 and 27, extend to the opposite end of the car. The shafts are journaled in the brackets 2ᶜ and also in bearings 30 adjacent to the ends of the car frame. Adjacent the brackets 2ᶜ and below the box bodies each of the shafts is provided with a pinion 28 adapted to mesh with an adjacent rack 22. It will be understood that there is a rack 22 for each pinion, and the said racks are respectively guided in contact with the pinion by the respective guide rollers 29 which are also journaled in the respective brackets 2ᶜ. The upper end of the rack 22 is hinged to the under side of the box body, or more specifically to the brace plates 9ᵇ secured thereto (Fig. 3). The lower portion of the rack is provided with a shoulder 23, which may contact with the guide roller 29 when the rack is fully elevated, to prevent disengagement. By rotating the shaft and its pinion 28 in one direction or the other, the box body 6 may be tilted or rocked to either side of the car frame; and the braces 9ᵇ may act as abutment stops to limit the tilting movement by coming in contact with the brackets 2ᶜ (Fig. 3). Furthermore, when the body is rocked or tilted to its full extent, the shoulder 15 of the rocker 7 abuts against the end of the rocker bed 8 and this enables the body to be held against shifting laterally under horizontal thrust toward the center of the car by the sliding of the contents of the body down the inclined floor or bottom.

The other ends of the several shafts, beyond the bearings 30, are provided with sprocket wheels 31, and these are rotated by operative means in the cabs 5 at each end of the car. The construction of these several means is best shown in Figs. 6, 7 and 8, and comprises a suitable frame 46 in which is journaled a sprocket pinion 33 having a gear 34. A chain 32 connects the sprocket pinion 33 with the sprocket wheel 31. The gear 34 meshes with a pinion 35 secured to a shaft 37 having a hand wheel 36 and also having a detent wheel 38. By rotating the hand wheel 36, the sprocket wheel 31 and its shaft may be rotated in either direction. A double acting pawl 39 pivoted on a pin 40 engages the detent wheel 36. This pawl may be oscillated and spring pressed into engagement with the detent wheel by the spring 41, which has one end connected with the pawl and the other end with the arm 42. This arm 42 is hinged at 43 to the frame 46 above the pawl (Fig. 8), and may be thrown about its hinge point to either side of the detent wheel 38, in which case the pawl will be required to act to permit the shaft 37 to be rotated in either direction only at one time and may act to hold the box body in its tilted or rocked position. When the body is in a horizontal position during transportation, it is desirable to lock the rack 22 when in the position shown at left hand of Fig. 3; this may be accomplished by throwing the arm 42 to a vertical position and inserting the pin 45 to hold it there. This action causes the notched end 44 to press upon the pawl 39 and force it toward the detent wheel 38 so that both pawl teeth come into engagement with the detent wheel at the same time, as indicated in dotted lines, and thus lock the shaft 37 against rotation in either direction. Any other suitable locking means may be employed in place of that here shown by way of example. The operative means is such, that one man may rock a loaded body with ease, especially so as the bodies are so supported that they offer a minimum resistance to movement. Any other suitable construction of operative means may be employed in lieu of that shown and may be operated by mechanical power, such as electricity, if it is available, though ordinarily manual power is found amply sufficient. As shown, there are two of these operative means for each cab and for two shafts, thereby providing for the four shafts, four of these operative means distributed in pairs at the two ends of the car. The general construction of car here shown is adapted for one or more bodies and hence I do not restrict myself to the number of such bodies.

To enable the bodies to be easily and quickly rocked by one man, it is advisable to so proportion the construction of the body and its rocker supports that the approximate center of gravity G is substantially vertically above the axial line of contact of the rocker 7 with the rocker beds 8, as indicated in Fig. 3. The vertical line from G will shift laterally as the body approaches a horizontal position and when this is reached, the vertical line of thrust will be central of the car. The same result takes place on either side of the central line as the body is tilted to one or the other side of the car. At all positions, the vertical downward thrust from the center G of gravity extends approximately through the axial line of contact between the rockers and their beds.

I have shown my improvements in the form which I have found most satisfactory in actual use; and while I prefer the construction shown, I do not restrict myself to the details, as these may be modified without departing from the spirit of the invention.

In this application, I make no claim to the specific construction of the box body having transverse divisions and a plurality of doors at each side, as that will form subject matter of a separate application.

Matters shown in this application and not claimed which relate to the rocking box body and means for tilting and locking the same, form subject matter of my application Ser. No. 848,728, filed June 3, 1914; and further I make no claim to the specific construction of the box body having transverse divisions and a plurality of doors at each side, as that will form subject matter of a separate divisional application.

Having now described my invention, what I claim as new and desire to secure by Letters Patent, is:—

1. In a dumping car, the combination of the car frame having a platform at each end and a plurality of transversely arranged rocker beds intermediate of the platforms, with a plurality of box bodies each having a plurality of rockers supported by the beds whereby the bodies may be rocked toward either side of the car frame to incline said body and lower one side thereof, side doors to said bodies to permit the discharge of the contents when desired, longitudinal shafts journaled in the car frame and extending between the platforms and the box bodies, connecting means between the said shafts and their respective box bodies for oscillating the latter, and mechanical means on the platforms for rotating the longitudinal shafts whereby the box bodies may be rocked upon their rockers and beds from the platforms.

2. In a dumping car, the combination of the car frame having a platform at each end and a plurality of transversely arranged rocker beds intermediate of the platforms, with a plurality of box bodies each having a plurality of rockers supported by the beds whereby the bodies may be rocked toward either side of the car frame to incline said body and lower one side thereof, side doors to said bodies to permit the discharge of the contents when desired, longitudinal shafts journaled in the car frame and extending between the platforms and the box bodies, connecting means between the said shafts and their respective box bodies for oscillating the latter, mechanical means on the platforms for rotating the longitudinal shafts whereby the box bodies may be rocked upon their rockers and beds from the platforms, and means for locking the shafts against rotation in one direction when the box body is tilted or being tilted.

3. In a dumping car, the combination of a longitudinal car frame having a plurality of transversely arranged rocker beds, a plurality of box bodies arranged end to end along the length of the car frame and each provided with curved rockers adapted to the rocker beds so that each of the bodies may be independently rocked for dumping its contents, a plurality of longitudinal shafts journaled in the car frame part of which extend to one end of the car frame and part to the other end of the car frame, mechanical connections between the respective car bodies and the longitudinal shafts whereby a rotation of each shaft may rock a different car body, and means at the ends of the car frame for rotating the longitudinal shafts.

4. In a dumping car, the combination of a longitudinal car frame having a plurality of transversely arranged rocker beds, a plurality of box bodies arranged end to end along the length of the car frame and each provided with curved rockers adapted to the rocker beds so that each of the bodies may be independently rocked for dumping its contents, a plurality of longitudinal shafts journaled in the car frame part of which extend to one end of the car frame and part to the other end of the car frame, mechanical connections between the respective car bodies and the longitudinal shafts whereby a rotation of each shaft may rock a different car body, means at the ends of the car frame for rotating the longitudinal shafts, and means for locking the shafts against rotation in either direction and in both directions at the will of the operator.

5. In a dumping car, the combination of a longitudinal car frame having a plurality of transversely arranged rocker beds, a plurality of box bodies arranged end to end along the length of the car frame and each provided with curved rockers adapted to the rocker beds so that each of the bodies may be independently rocked for dumping its contents, a plurality of longitudinal shafts journaled in the car frame, and extending from the end of the car frame to points beneath the respective box bodies, mechanical connections between the respective car bodies and the longitudinal shafts whereby a rotation of each shaft may rock a different car body, and independent means at the end of the car frame for rotating the respective longitudinal shafts and holding the tilted bodies in tilted positions.

6. In a dumping car, the combination of the longitudinal car frame having a plurality of transverse rocker beds, a box body arranged above the longitudinal frame and having a plurality of rockers on its under side adapted to the beds said body provided with discharge doors on its sides, a longitudinal shaft journaled on the longitudinal car frame and extending to the end portion thereof, a mechanical connection between the longitudinal shaft and the box body whereby the rotation of the shaft will rock the body upon the beds, and means at the end of the car frame for rotating the longitudinal shaft consisting of a sprocket wheel on the longitudinal shaft, a sprocket pinion arranged above the shaft on the car frame, a sprocket chain connecting the sprocket wheel and pinion, a hand wheel, power multiplying gearing between the hand wheel and the sprocket pinion, and locking means for locking the pinion and hand wheel against rotation when the box body is tilted and also locking the parts against rotation in either direction when the box body is in its normal untilted position.

7. In a dumping car, the combination of a longitudinal car frame having a plurality of transverse beds each provided with teeth arranged longitudinally of the car frame and with openings between them through which dirt may be discharged and also having a central wide transverse flat portion, a body arranged above the car frame and having rockers on its under side resting upon the beds and each having teeth upon its curved portions to engage the spaces between the teeth on the beds and also having a flat portion at its extreme bottom to coöperate with the flat portion of the bed to cause the body to normally remain in a horizontal plane when not being tilted for dumping, and mechanical means for positively rocking the body and its rockers.

8. In a dumping car, the combination of a longitudinal car frame having a plurality of transverse beds and corresponding brackets extending laterally therefrom, a body portion having rockers on its under side adapted to the beds for tilting the body transversely to the length of the car frame, said rockers provided with abutment shoulders at each end reinforced by downwardly extending longitudinal brace beams and transverse brace plates or brackets to prevent lateral backward shifting of the rockers on the beds when fully rocked in either direction, and mechanical devices for rocking the body and its rockers.

9. In a dumping car, the combination of the longitudinal car frame having a plurality of transverse beds, a body portion having rockers on its under side adapted to the beds for tilting the body transversely to the length of the car said rockers provided with abutment shoulders on their ends to prevent lateral shifting of the rockers on the beds when fully rocked, and mechanical devices for rocking the body and its rockers consisting of a longitudinal shaft journaled on the car frame and extending from below the body toward the end of the car frame, a pinion on the shaft below the body, a guide on the car frame to one side of the pinion, a rack engaging the pinion and held in operative relation therewith by the guide and jointed at its upper end to the under part of the body, and means at the end of the car frame for rotating the longitudinal shaft.

In testimony of which invention, I hereunto set my hand.

ALBERT C. MURPHY.

Witnesses:
HENRY F. FLOWERS,
K. MARGUERITE NICHOLAS.